US012688169B2

(12) United States Patent
Fan

(10) Patent No.: US 12,688,169 B2
(45) Date of Patent: Jul. 21, 2026

(54) METHOD, DEVICE, AND COMPUTER PROGRAM PRODUCT FOR DATA MIGRATION

(71) Applicant: Dell Products L.P., Round Rock, TX (US)

(72) Inventor: Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/680,782

(22) Filed: May 31, 2024

(65) Prior Publication Data

US 2025/0321939 A1 Oct. 16, 2025

(30) Foreign Application Priority Data

Apr. 11, 2024 (CN) .......................... 202410436884.9

(51) Int. Cl.
*G06F 16/21* (2019.01)
*G06F 11/34* (2006.01)
*G06F 16/27* (2019.01)

(52) U.S. Cl.
CPC ........ *G06F 16/214* (2019.01); *G06F 11/3409* (2013.01); *G06F 16/27* (2019.01)

(58) Field of Classification Search
CPC .................................................. G06F 16/214
USPC ........................................................ 707/609
See application file for complete search history.

(56) References Cited

U.S. PATENT DOCUMENTS

| | | | | |
|---|---|---|---|---|
| 8,655,841 B1* | 2/2014 | Sridharan | ........... | G06F 11/1461 |
| | | | | 707/625 |
| 2014/0164328 A1* | 6/2014 | Calo | ....................... | G06F 16/27 |
| | | | | 707/626 |
| 2015/0278283 A1* | 10/2015 | O'Krafka | ............ | G06F 16/2246 |
| | | | | 707/609 |
| 2021/0405881 A1* | 12/2021 | Voecks | .................... | G06F 3/065 |
| 2022/0334724 A1* | 10/2022 | Wu | ....................... | G06F 3/0611 |

* cited by examiner

*Primary Examiner* — Muluemebet Gurmu
(74) *Attorney, Agent, or Firm* — Amin, Turocy & Watson, LLP

(57) ABSTRACT

An example data migration includes, based on historical access data for objects, determining access patterns for the objects, and, based on the access patterns, determining access frequencies for the objects in a full replication stage. Based on the access frequencies for the objects, full replication is carried out on the objects, and, in response to completion of the full replication of the objects, incremental replication is carried out on at least part of the objects to complete data migration. In this way, the access frequencies for the objects can be predicted more accurately, then the objects with low access frequencies are preferentially replicated in the full replication stage, and the workload of incremental replication is reduced, thereby improving the efficiency and quality of data migration, reducing the probability of migration failure, avoiding unnecessary data transmission, and effectively reducing the demands for network bandwidth and data storage.

20 Claims, 10 Drawing Sheets

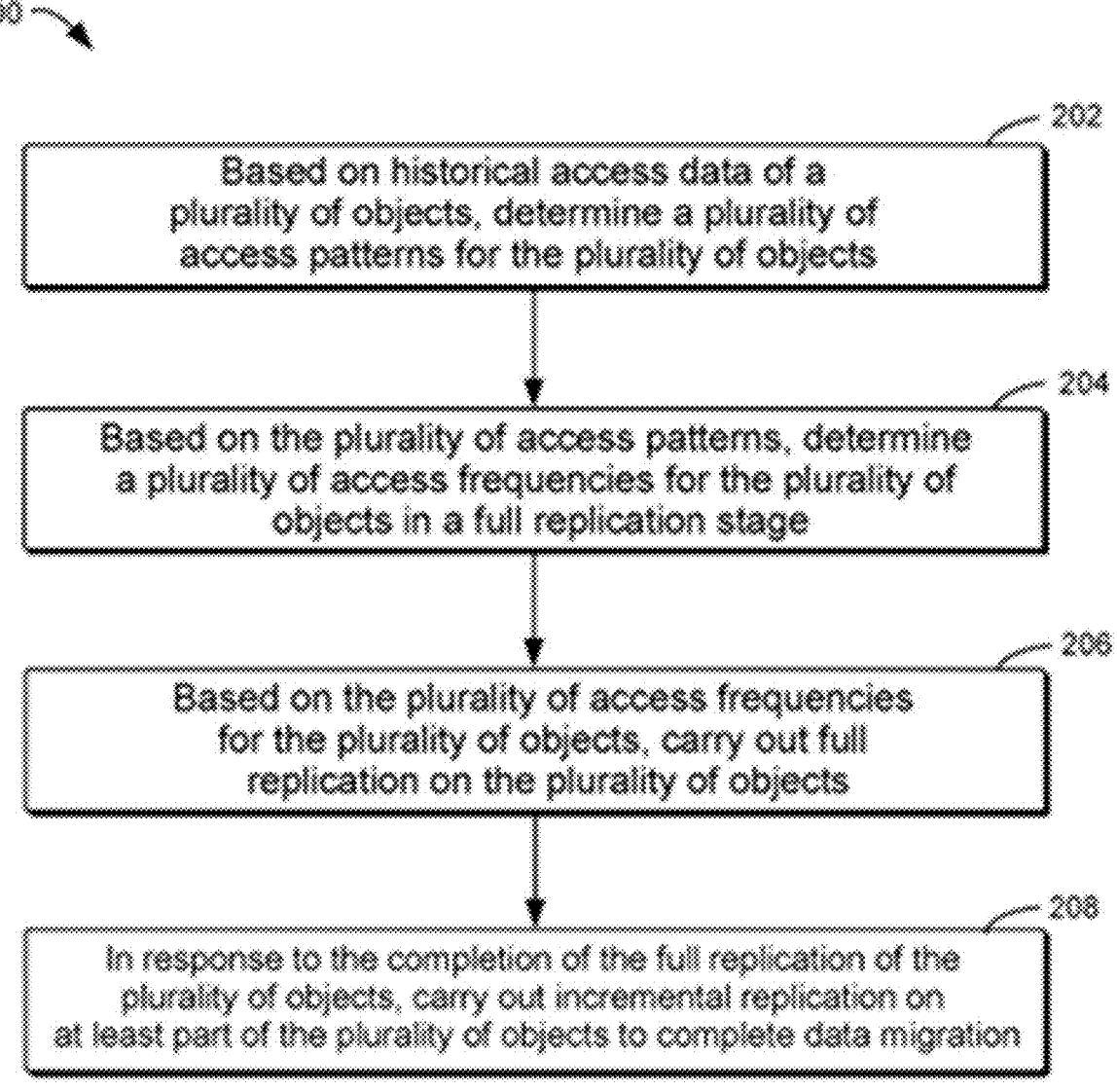

Based on historical access data of a plurality of objects, determine a plurality of access patterns for the plurality of objects Based on the plurality of access patterns, determine a plurality of access frequencies for the plurality of objects in a full replication stage Based on the plurality of access frequencies for the plurality of objects, carry out full replication on the plurality of objects In response to the completion of the full replication of the plurality of objects, carry out incremental replication on at least part of the plurality of objects to complete data migration

FIG. 2

METHOD, DEVICE, AND COMPUTER PROGRAM PRODUCT FOR DATA MIGRATION

RELATED APPLICATION

The present application claims the benefit of priority to Chinese Patent Application No. 202410436884.9, filed on Apr. 11, 2024, which application is hereby incorporated into the present application by reference herein in its entirety.

TECHNICAL FIELD

Embodiments of the present disclosure relate to the field of data management, and, for instance, to data migration.

BACKGROUND

Data migration is a technology that integrates offline storage with online storage. It takes a high-speed and high-capacity non-online storage device as a next-level device of a disk device, and then automatically migrates frequently used data in a disk to a second-level mass storage device such as a tape library in accordance with a specified strategy, that is, migrates frequently used data from a source side to a target side in accordance with a specified strategy.

Generally, in data migration, data is transferred in stages, a first stage is a full replication stage, and full replication, also known as baseline replication, is directed to migrate all data from a source side to a target side. A second stage is an incremental replication stage, and incremental replication is directed to migrate data that has changed on the source side to the target side without a need for full migration of an entire database.

SUMMARY

Example embodiments of the present disclosure propose a method, a device, and a computer program product for data migration.

In a first example embodiment of the embodiments of the present disclosure, there is provided a method for data migration. The method includes based on historical access data for a plurality of objects, determining a plurality of access patterns for the plurality of objects. The method further includes based on the plurality of access patterns, determining a plurality of access frequencies for the plurality of objects in a full replication stage. The method further includes based on the plurality of access frequencies for the plurality of objects, carrying out full replication on the plurality of objects. The method further includes in response to completion of the full replication of the plurality of objects, carrying out incremental replication on at least part of the plurality of objects to complete data migration.

In a second example embodiment of the embodiments of the present disclosure, there is provided an electronic device. The electronic device includes one or more processors; and a storage apparatus configured to store one or more programs that, when executed by the one or more processors, cause the one or more processors to implement a method for data migration, the method including based on historical access data for a plurality of objects, determining a plurality of access patterns for the plurality of objects. The method further includes based on the plurality of access patterns, determining a plurality of access frequencies for the plurality of objects in a full replication stage. The method further includes based on the plurality of access frequencies for the plurality of objects, carrying out full replication on the plurality of objects. The method further includes in response to completion of the full replication of the plurality of objects, carrying out incremental replication on at least part of the plurality of objects to complete data migration.

In a third example embodiment of the embodiments of the present disclosure, there is provided a computer-readable storage medium that stores thereon a computer program that, when executed by a processor, implements a method for data migration, the method including based on historical access data for a plurality of objects, determining a plurality of access patterns for the plurality of objects. The method further includes based on the plurality of access patterns, determining a plurality of access frequencies for the plurality of objects in a full replication stage. The method further includes based on the plurality of access frequencies for the plurality of objects, carrying out full replication on the plurality of objects. The method further includes in response to completion of the full replication of the plurality of objects, carrying out incremental replication on at least part of the plurality of objects to complete data migration.

It should be understood that the contents described in this SUMMARY is neither intended to limit key or essential features of the embodiments of the present disclosure, nor intended to limit the scope of the present disclosure. Other features of the present disclosure will become readily understood from the following descriptions.

BRIEF DESCRIPTION OF THE DRAWINGS

The above and other features, advantages, and aspects of the embodiments of the present disclosure will become more apparent with reference to the drawings and the detailed descriptions below. In the drawings, identical or similar reference numerals represent identical or similar elements, in which:

FIG. 2 illustrates a flow chart of a method for data migration according to some embodiments of the present disclosure;

In all of the drawings, identical or similar reference numerals indicate identical or similar elements.

DETAILED DESCRIPTION

Figure 1:
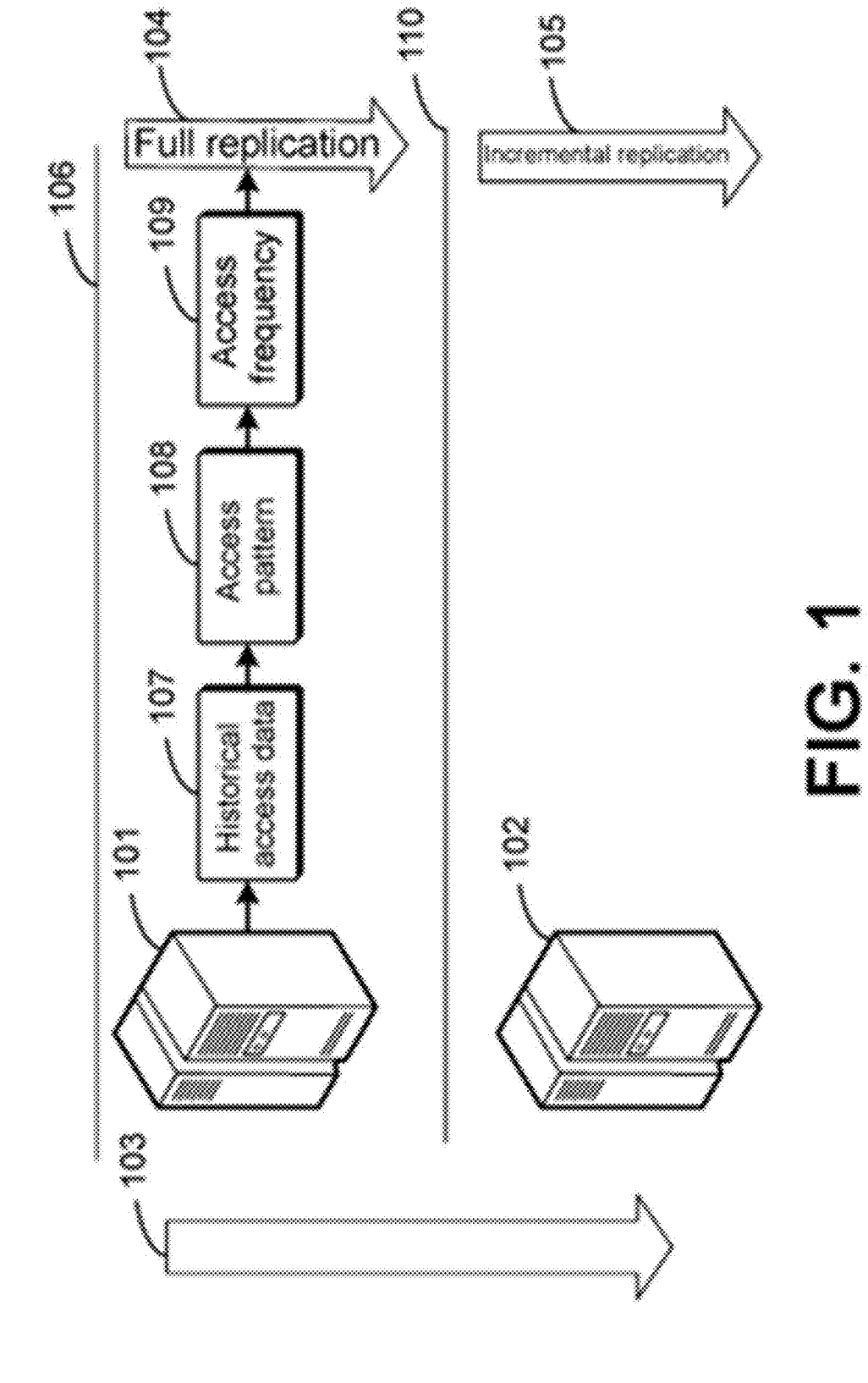
FIG. 1 illustrates a schematic diagram of an example environment in which a plurality of embodiments of the present disclosure can be implemented.

Embodiments of the present disclosure will be described below in further detail with reference to the drawings. Although some embodiments of the present disclosure are shown in the drawings, it should be understood that the present disclosure can be implemented in various forms and should not be interpreted as being limited to the embodiments set forth herein, but rather these embodiments are provided for understanding the present disclosure more thoroughly and completely. It should be understood that the drawings and embodiments of the present disclosure are for exemplary purposes only, and are not intended to limit the scope of protection of the present disclosure.

In the descriptions of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects, unless explicitly illustrated. Other explicit and implicit definitions may also be included below.

In a full replication stage, migration of a database from a source side to a target side in accordance with a specified strategy is implemented; in a normal way, data on the source side is divided into cold data and hot data, and full replication is carried out based on the types of the cold and hot data, where the cold data indicates the data that is predicted to not change in the full replication stage, and the hot data indicates the data that is predicted to change in the full replication stage. In general, relevant technologies achieve division of cold and hot data by detecting whether data has changed within a past time threshold. For example, data that has not changed in a certain past period of time can be defined as cold data, and data that has changed can be defined as hot data.

After the full replication is completed, data migration enters an incremental replication stage. The incremental replication requires or implicates migrating the changed data from the source side to the target side. In the incremental replication stage, two components are generally responsible for migration, where one component is a synchronizer configured to ensure that any data changes can be saved on the source side and the target side, and the other component is a mover configured to migrate the changed data to the target side. After a migration begins, since the cold data may be transformed into the hot data, the division of the cold and hot data only by detecting whether the data has changed in the past time threshold will cause a lot of work to pile up in the incremental replication stage, and a long incremental replication duration may cause data migration to fail; and since incremental replication is much more complex than baseline replication, especially when the mover and the synchronizer must work cooperatively, a conflict between the mover and the synchronizer may cause the data migration to fail.

For this reason, the embodiments of the present disclosure provide a solution for data migration. The solution is to determine an access pattern by analyzing historical access data for an object, then to determine an access frequency for the object in a full replication stage based on the access pattern, and to carry out full replication and incremental replication based on the access frequency for the object. In this way, the access frequency for the object can be predicted more accurately, then migration work is scheduled in the full replication stage as much as possible, and the workload of incremental replication is reduced, thereby improving the efficiency and quality of data migration, reducing the probability of migration failure, avoiding unnecessary data transmission, and greatly reducing the demand for network bandwidth and data storage.

FIG. 1 illustrates a schematic diagram of an example environment 100 in which a plurality of embodiments of the present disclosure can be implemented. As shown in FIG. 1, the example environment 100 can include a source side 101 which is a start point of a data migration 103, i.e., a location or system where data originally is located. The source side 101 provides data to be migrated. The data may be stored in databases, file systems, applications, or other storage media. The example environment 100 can further include a target side 102 which is an end point of the data migration 103, i.e., a location or system where data eventually arrives at. The target side 102 receives and stores the data migrated from the source side 101. The data will be used in a new environment for a variety of purposes such as analysis, backup, archiving, application integration, and the like. The source side 101 and the target side 102 of the data migration 103 represent the start point and the end point of the data respectively. During the data migration 103, these two points need to be carefully planned and managed to ensure data integrity, accuracy, and security.

In some embodiments, before a start 106 of the data migration 103, users can be asked if they consent to collect historical access data. The data migration 103 is a process involving a plurality of stages, in which full replication 104 and incremental replication 105 are the key steps. The full replication 104 stage is a key step in the entire data migration 103 process, and the full replication 104 involves replicating all data (or referred to as the entire data set) from the source side 101 to the target side 102 in its entirety. After the full replication 104 is completed, the data migration 103 has a stage transformation 110 to enter an incremental replication 105 stage, where the incremental replication 105 mainly focuses on data that is newly added or modified on the source side 101 after the full replication 104 is completed. In this stage, a migration tool or system will replicate only the data that has changed after the full replication 104 is completed, rather than replicate the entire data set again. This can greatly reduce the overhead of data transmission and speed up the migration process.

According to example embodiments of the present disclosure, historical access data 107 of a plurality of objects may be collected before the data migration 103 begins, where the objects may include files and folders, and a collection way may be to periodically collect the historical access data 107 when the system is idle, that is, before the data migration 103 begins. A process of obtaining the historical access data 107 may include monitoring and recording information such as when each object is accessed, an identity of a visitor, an access pattern (e.g., reading, writing, etc.), and an access duration. Ways of obtaining may include log analysis, file system monitoring, or dedicated audit tools, the contents and the ways described above are exemplary, and there is no restriction on the contents and the ways of obtaining of the historical access data 107 in the present disclosure.

With reference to FIG. 1, the example environment 100 may further include an access pattern 108 and an access frequency 109, and after sufficient historical access data 107 is obtained, the access pattern 108 of each object can be analyzed. The access pattern 108 refers to a regularity feature of accesses to an object, which may be influenced by a variety of factors such as working hours, business needs, user behaviors, and the like. For example, some files may be accessed frequently in certain periods of time each day, while some folders may only be used in certain working processes. By analyzing the access pattern 108, it is possible to predict the access frequency 109 for each object in the full replication stage 104. The access frequency 109 refers to the number of accessing times or a frequency distribution that each object may be accessed in the full replication stage 104. After the access frequency 109 for each object is determined, the full replication 104 is carried out.

As can be seen from the above illustration, the solution of the present disclosure is to determine the access pattern by analyzing the historical access data of each object, then to determine the access frequency for the object in the full replication stage based on the access pattern, and to carry out full replication and incremental replication based on the access frequency for each object. In this way, the access frequencies of the objects can be predicted more accurately, the objects with low access frequencies are preferentially replicated in the full replication stage, and the workload of incremental replication is reduced, thereby improving the efficiency and quality of data migration, reducing the probability of migration failure, avoiding unnecessary data transmission, and greatly reducing the demand for network bandwidth and data storage.

It should be understood that description of the architecture and function in the example environment 100 is made for illustrative purposes only and does not imply any limitation to the scope of the present disclosure. The embodiments of the present disclosure may also be applied to other environments having different structures and/or functions.

The processes according to example embodiments of the present disclosure will be described in detail below with reference to FIGS. 2-10. For ease of understanding, the specific data mentioned in the following description are all intended for purposes of illustration only and are not intended to limit the scope of the present disclosure. It should be understood that the embodiments described below may also include additional actions not shown and/or may omit actions shown, and the scope of the present disclosure is not limited in this regard.

FIG. 2 illustrates a flow chart of a method 200 for data migration according to some embodiments of the present disclosure. At block 202, based on historical access data for a plurality of objects, a plurality of access patterns for the plurality of objects are determined. For example, as shown in FIG. 1, the historical access data 107 for a plurality of objects can be periodically obtained when a system is idle, that is, before the data migration 103 begins, and then analyzed to obtain the access pattern 108 for each object. Periodically obtaining the historical access data 107 can ensure that sufficient data is effectively collected for subsequent analysis without affecting the normal operation of the system. Detection on the historical access data 107 is dynamically updated with time, and this dynamic updating mechanism can well reflect the latest access status of the object and ensure the timeliness and validity of the data.

In some embodiments, after the historical access data 107 is obtained, the access pattern can be determined based on data pattern detection and statistical analysis/data fitting model techniques, e.g., the historical access data 107 is fit using the least square method, the autocorrelation method, or the discrete Fourier transform method to obtain the access pattern 108.

At block 204, based on the plurality of access patterns, a plurality of access frequencies for the plurality of objects in a full replication stage are determined. For example, as shown in FIG. 1, the access frequency for each object in the full replication 104 stage is determined based on the access pattern 108. The access pattern 108 may be a probability function. The probability function can describe the possibility of accesses to an object in different periods of time and reflects the regularity of accesses to the object, and in the embodiments of the present disclosure, the access situation of each object in the full replication 104 stage can be more accurately predicted by determining the access pattern, thereby providing strong support for the formulation of data migration strategies.

At block 206, based on the plurality of access frequencies for the plurality of objects, full replication is carried out on the plurality of objects. For example, as shown in FIG. 1, when the full replication 104 is carried out on the plurality of objects, in consideration of the access frequencies 109 of different objects, a replication sequence can be provided, for example, the objects with low access frequencies 109 can be arranged before the objects with high access frequencies 109 for replication.

Such a strategy has several advantages as follows. First of all, since the objects with low access frequencies 109 are relatively less likely to be accessed after being replicated, prioritized replication of these objects can ensure that in the incremental replication 105 stage, these objects will change relatively little, thus reducing the workload of the incremental replication 105 stage. Secondly, the objects with high access frequencies 109 are arranged behind for replication, which can ensure that there is more time to capture newly added and modified data for these objects in the full replication 104 stage. Since these objects are likely to be frequently accessed after the migration begins, their newly added and modified data are placed in the full replication 105 stage as much as possible, which can effectively reduce the demands for data synchronization of these objects in the incremental replication 105 stage, thereby further improving the migration efficiency.

At block 208, in response to completion of the full replication of the plurality of objects, incremental replication is carried out on at least part of the plurality of objects to complete data migration. For example, as shown in FIG. 1, after the full replication 104 is completed, the data migration 103 has a stage transformation 110 to enter an incremental replication 105 stage, where the incremental replication 105 mainly focuses on the data that is newly added or modified on the source side 101 after the full replication 104 is completed.

The incremental replication 105 writing process includes creating a stub file on the target side 102 (this step is called partial filling) and changing the file status to "suspended" when no object exists on the target side 102. When a stub file exists on the target side 102 and the data is not moved, a write is suspended. The synchronizer overwrites incremental data to the source side 101 and then waits for the mover to replicate the data from the source side 101 to the target side 102. After the mover starts to replicate, the file status is changed to "moving." When a stub file exists on the target side 102 and the data is being moved, the mover first replicates unmoved data from the source side 101 to the target side 102. The synchronizer then overwrites incremental data to the source side 101 and then to the target side 102, at which point a locking mechanism is needed to coordinate the synchronizer and the mover. When the stub file and the data are all moved to the target side 102, the synchronizer writes an increment to the source side 101 and then to the target side 102. After the incremental replication 105 is completed, the data migration 103 is completed.

In this way, an effect of placing the newly added and modified data of the objects with high access frequencies in the full replication stage as much as possible can be achieved, so that the workload of incremental replication is reduced, and the overall efficiency and quality of data migration are improved, thereby reducing risks and costs during migration, and providing users with more stable and reliable data access services.

A process of data migration will be specifically described in detail below with reference to FIGS. 3-10. In the embodiments of the present disclosure, explanations will be made according to a sequence of a trend pattern, a cyclical pattern, and an irregular pattern in a data migration. The specific data referred to in the following description are exemplary and are not intended to limit the scope of protection of the present disclosure. It should be understood that the embodiments described below may also include additional actions not shown and/or may omit actions shown, and the scope of the present disclosure is not limited in this regard.

Figure 3:
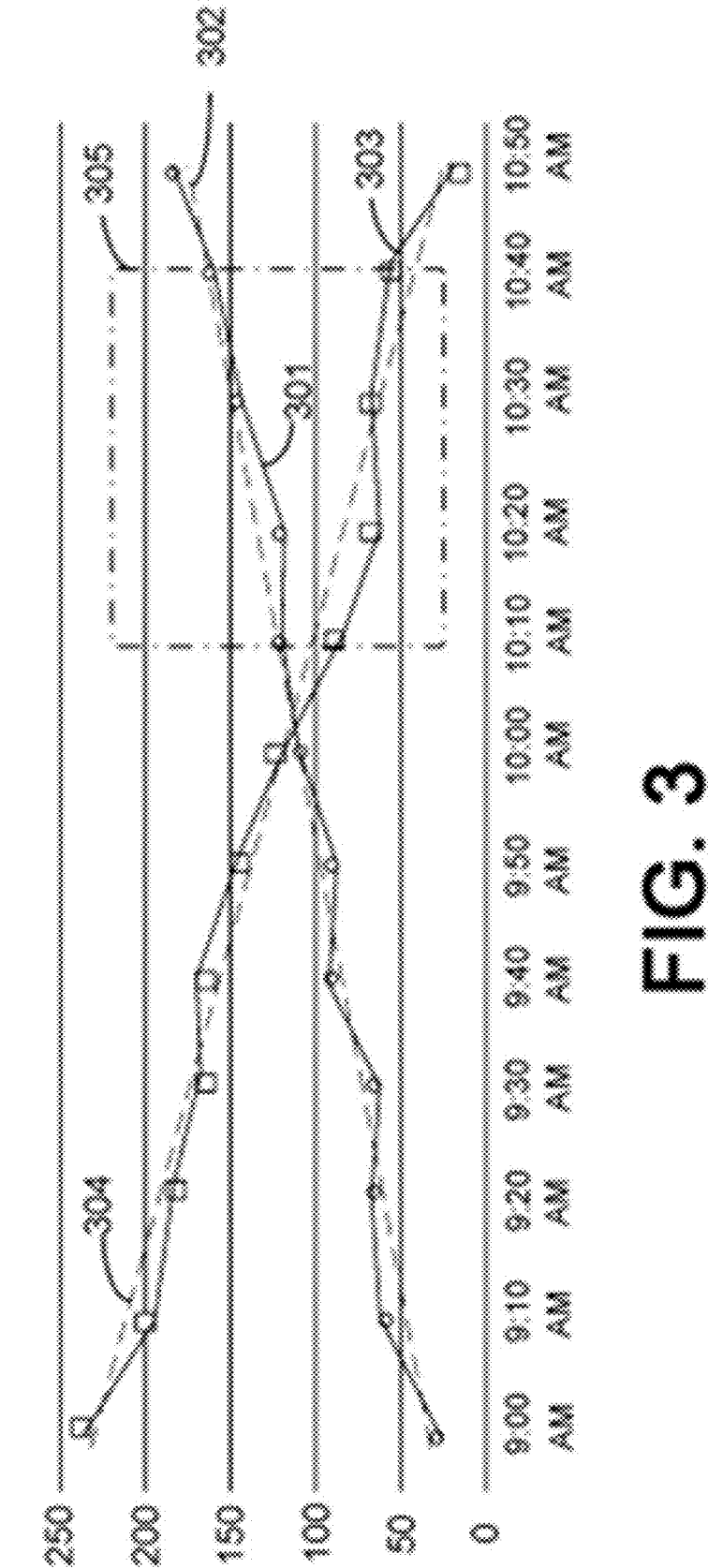
FIG. 3 illustrates a schematic diagram of a trend pattern according to some embodiments of the present disclosure.

FIG. 3 illustrates a schematic diagram of a trend pattern 300 according to some embodiments of the present disclosure. In some embodiments, when an access pattern is determined for each object, the determined access pattern may be the trend pattern 300. The trend pattern 300 is a noticeable trend of an increase or decrease in a data series over a long period of time. This trend can be linear or non-linear, and reflects an overall direction of change of the data over time, for example, the trend pattern 300 may include an increase trend 301 and a decrease trend 303, the increase trend 301 fitting a linear increasing function 302, and the decrease trend 303 fitting a linear decreasing function 304.

In some embodiments, in response to the access pattern being the trend pattern 300, a trend function and a full replication time 305 can be determined first, and then based on the trend function and the full replication time, an access frequency for each object in a full replication stage can be determined. When the full replication time 305 is determined, factors such as performances of master nodes, network bandwidth, and data volume must be taken into account. In actual operations, these factors can be evaluated based on specific application scenarios and requirements, and the time for full replication can be predicted accordingly.

In some embodiments, for the trend pattern 300, a plurality of access frequencies for each object at a plurality of time points within the full replication time can be determined, and then an access frequency for each object in the full replication stage can be determined based on an average of the plurality of access frequencies at the plurality of time points. For example, in FIG. 3, when an access frequency for an object at 10:10 am is evaluated, the system will refer to an average of predicted access frequencies in an upcoming full replication time 305 stage (e.g., when the full replication time 305 is 30 minutes and the sampling period is 10 minutes, values for four time points, i.e., 10:10 am, 10:20 am, 10:30 am, and 10:40 am, are used). In the embodiments of the present disclosure, for the trend pattern 300, the access frequency can be expressed as:

$$WIOPS_{file\,i,t} = \text{Average}\,\{TrendFunc(W_{file\,i,coming\,T\,period})\} \qquad (1)$$

where $WIOPS_{file\,i,t}$ indicates an access frequency of file i at time point t, $TrendFunc(W_{file\,i,t})$ indicates a trend function of file i at time point t, and T indicates a full replication time.

Figure 4:
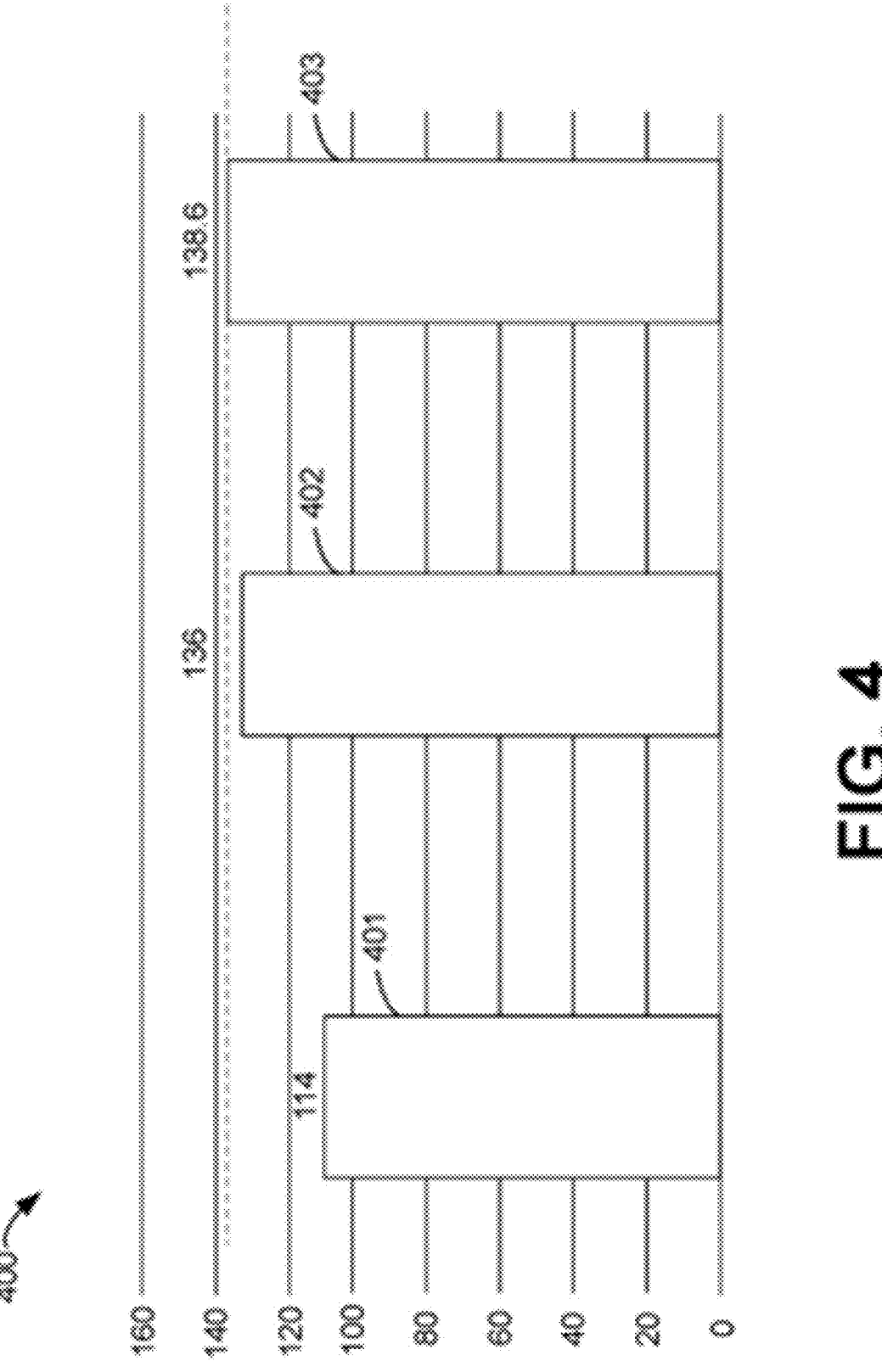
FIG. 4 illustrates a schematic diagram of an access frequency determined in the trend pattern according to some embodiments of the present disclosure.

FIG. 4 illustrates a schematic diagram of an access frequency 400 determined in the trend pattern according to some embodiments of the present disclosure. As shown in FIG. 4, an access frequency 401 predicted by a relevant technique is "114," which has a deviation rate of 17.75% from an actual access frequency 403; and an access frequency predicted by the method of data migration provided by the present disclosure is "136," which has a deviation rate of only 1.88% from the actual access frequency 403. As the trend function steepens, the deviation rate becomes more obvious. Thus, the access frequency predicted by the method of data migration provided by the present disclosure is more accurate.

Figure 5:
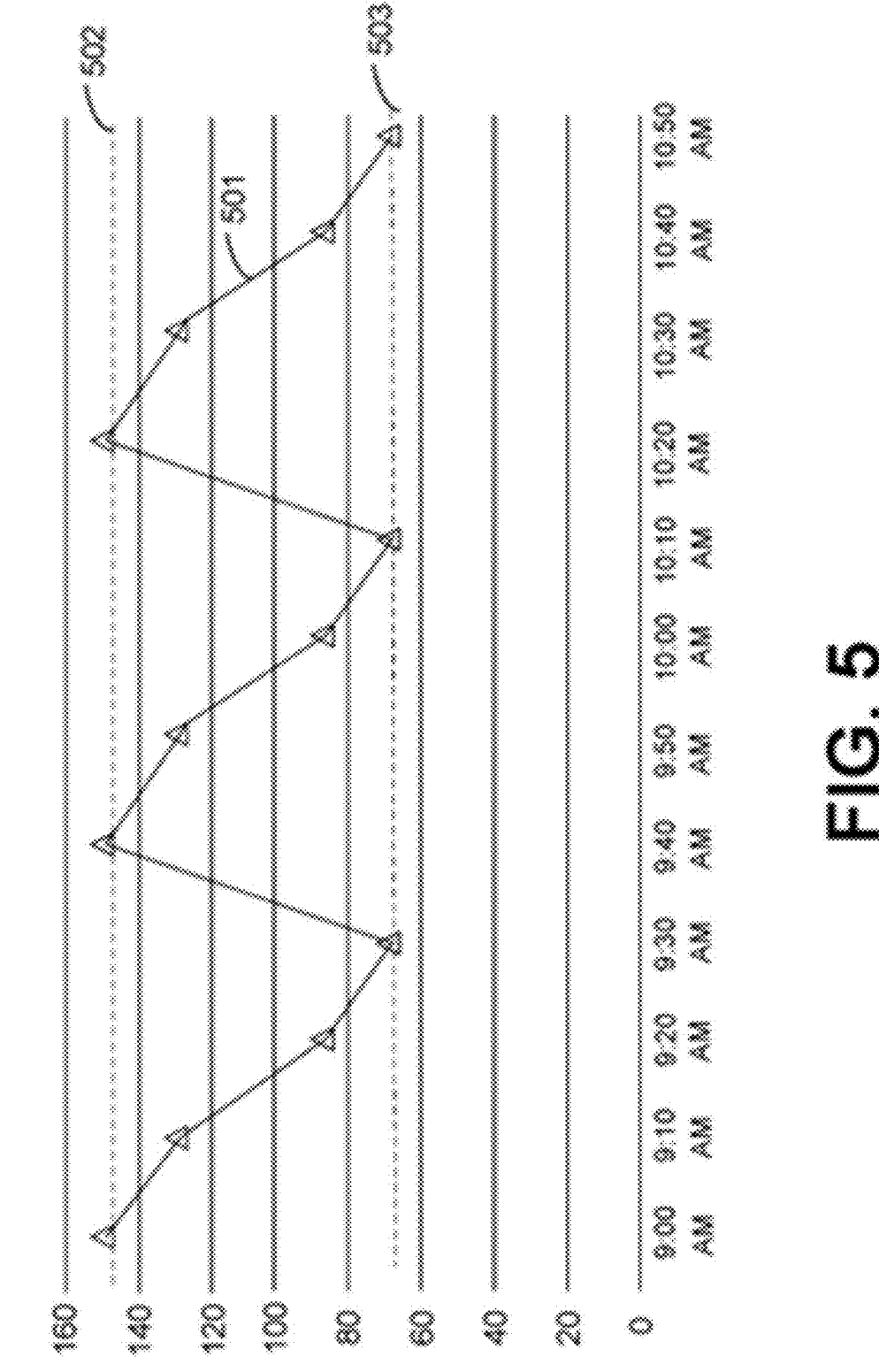
FIG. 5 illustrates a schematic diagram of a cyclical pattern according to some embodiments of the present disclosure.

FIG. 5 illustrates a schematic diagram of a cyclical pattern 500 according to some embodiments of the present disclosure. In some embodiments, when an access pattern is determined for each object, the determined access pattern may be the cyclical pattern 500. The cyclical pattern 500 means that data always goes up and down according to a certain rule. For example, the time series of seasonality data is affected by seasonal factors, and the data is in a fixed or known regularity (e.g., daily, weekly, monthly, yearly, etc.). To determine whether historical access data is cyclical, autocorrelation and discrete Fourier transform methods may be used to detect the periodicity and to further determine the period or frequency of a cyclical or seasonal time series. In the embodiments of the present disclosure, the historical access data can be fitted by discrete Fourier transform (DFT) to obtain a cyclical access pattern, where a DFT of a discrete time series f(n), n=0, 1, . . . , N−1 is defined as:

$$F(m) = \sum_{n=0}^{N-1} f(n)e^{-2\pi\frac{nm}{N}i} \qquad (2)$$

The series of collected historical access data forms a time series $\{t_s[k]\}$, and by carrying out DFT and frequency spectrum analysis on the time series $\{t_s[k]\}$, it is easy to determine whether the time series $\{t_s[k]\}$ is periodic, for example, when the frequency $f_s$ at which the spectrum is maximized is determined, the period is $T_s=1/f_s$.

In some embodiments, in response to the access pattern being the cyclical pattern 500, a cyclical function 501 can be determined first, and then based on the cyclical function 501, a maximum value 502 and a minimum value 503 of the access frequency in the historical access data can be determined, and then based on an average of the maximum value 502 and the minimum value 503, the access frequency for each object in the full replication stage can be predicted. In the embodiments of the present disclosure, for the cyclical pattern 500, the access frequency can be expressed as:

$$WIOPS_{file} = \frac{WIOPS_{max} + WIOPS_{min}}{2} \qquad (3)$$

where $WIOPS_{file}WIOPS_{file}$ indicates the access frequency, $WIOPS_{max}$ indicates the maximum value, and $WIOPS_{min}$ indicates the minimum value.

Figure 6:
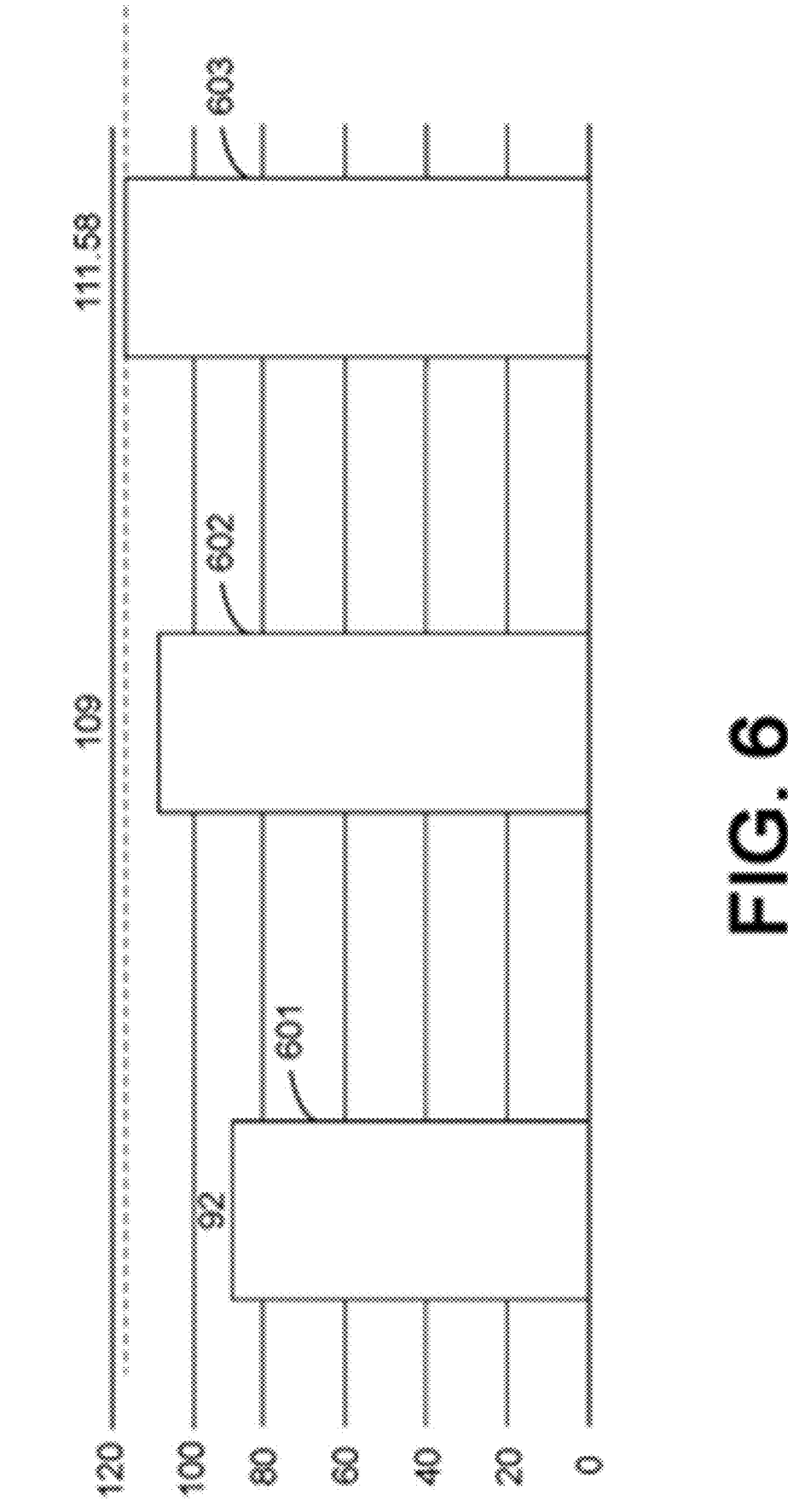
FIG. 6 illustrates a schematic diagram of an access frequency determined in the cyclical pattern according to some embodiments of the present disclosure.

FIG. 6 illustrates a schematic diagram of an access frequency 600 determined in the cyclical pattern according to some embodiments of the present disclosure. As shown in FIG. 6, for example, the system triggers a full replication request every hour (9:00 am, 10:00 am, and 11:00 am). When full replication is triggered at 10:00 am, the system will predict an access frequency at 10:00 am. Full replication is set to be completed in 40 minutes. When computation is made according to relevant techniques, a frequency 601 is equal to a value near 10:00 am, i.e., "92"; and when computation is made according to the method for data migration provided by the present disclosure, an access frequency 602 is equal to an average "109." The system will not take this predicted value as an access frequency reference value until a next full replication request is triggered at 11 a.m. It is not difficult to find that in the period from 10:00 am to 11:00 am, the frequency 601 has a large deviation (about 17.55%) from an actual access frequency 603 by using relevant techniques, and is very close to the actual access frequency 603 (the deviation rate is only 2.31%) by using the method for data migration provided by the present disclosure.

Figure 7:
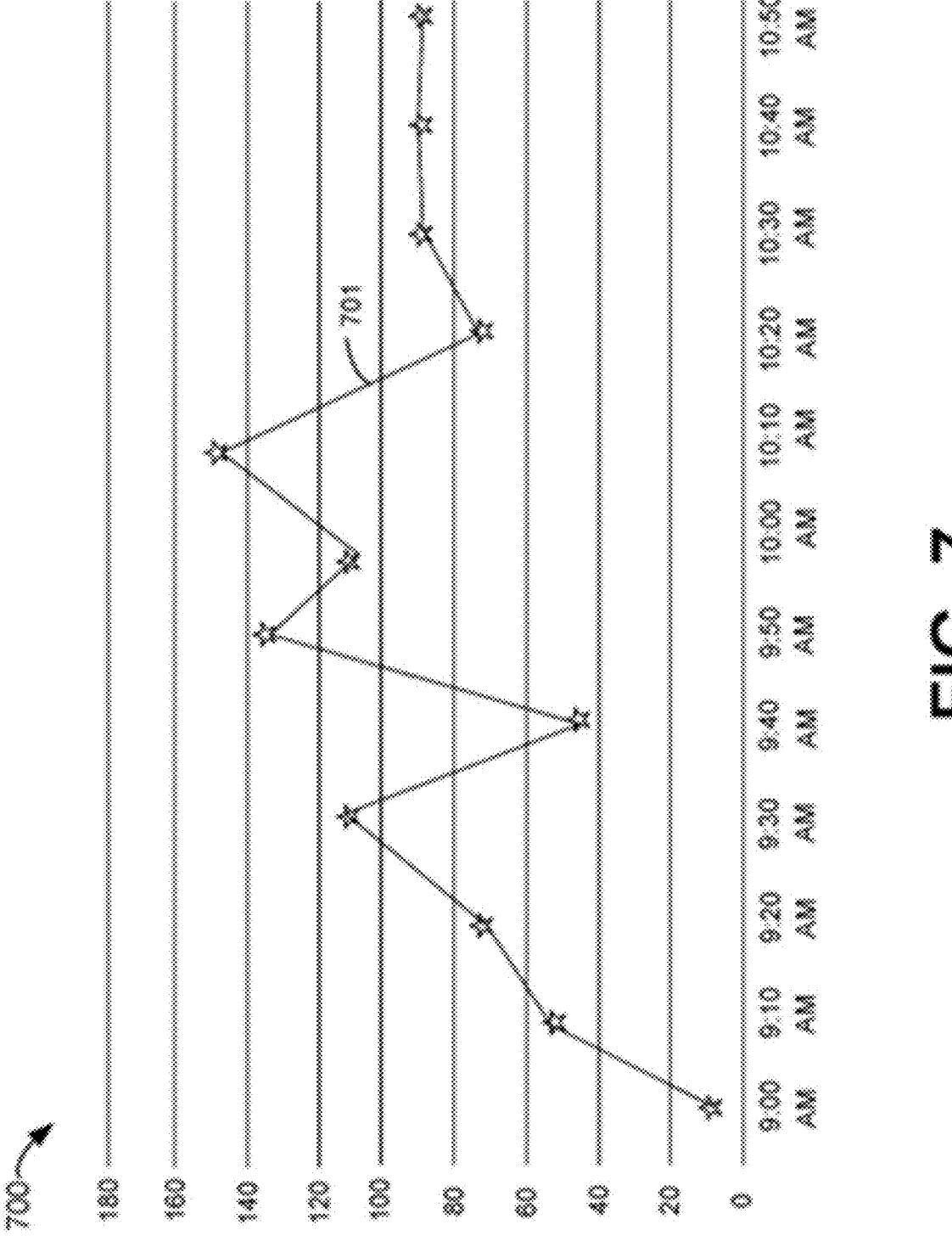
FIG. 7 illustrates a schematic diagram of an irregular pattern according to some embodiments of the present disclosure.

FIG. 7 illustrates a schematic diagram of an irregular pattern 700 according to some embodiments of the present disclosure. In some embodiments, when an access pattern is determined for each object, the determined access pattern may be the irregular pattern 700. In response to the access pattern being the irregular pattern 700, an average of access frequencies in historical access data 701 can be determined first, and then an access frequency for each object in the full replication stage can be determined based on the average of the access frequency in the historical access data 701. In the irregular pattern 700, the data follows a uniform probability density function, so a file write access frequency of file i at time point t can be predicted from the average of the long-term history access data 701. The longer the historical access data 701 is, the more accurate a predicted future value is. In this case, a value of the file write access frequency is dynamic, but varies slightly from a historical average. In the embodiments of the present disclosure, for the irregular pattern 700, the access frequency can be expressed as:

$$WIOPS_{file\,i,t} = \text{Average } \{WIOPS_{file\,i,0\ldots now}\} \qquad (4)$$

where $WIOPS_{file\,i,t}$ indicates the access frequency of file i at time point t.

Figure 8:
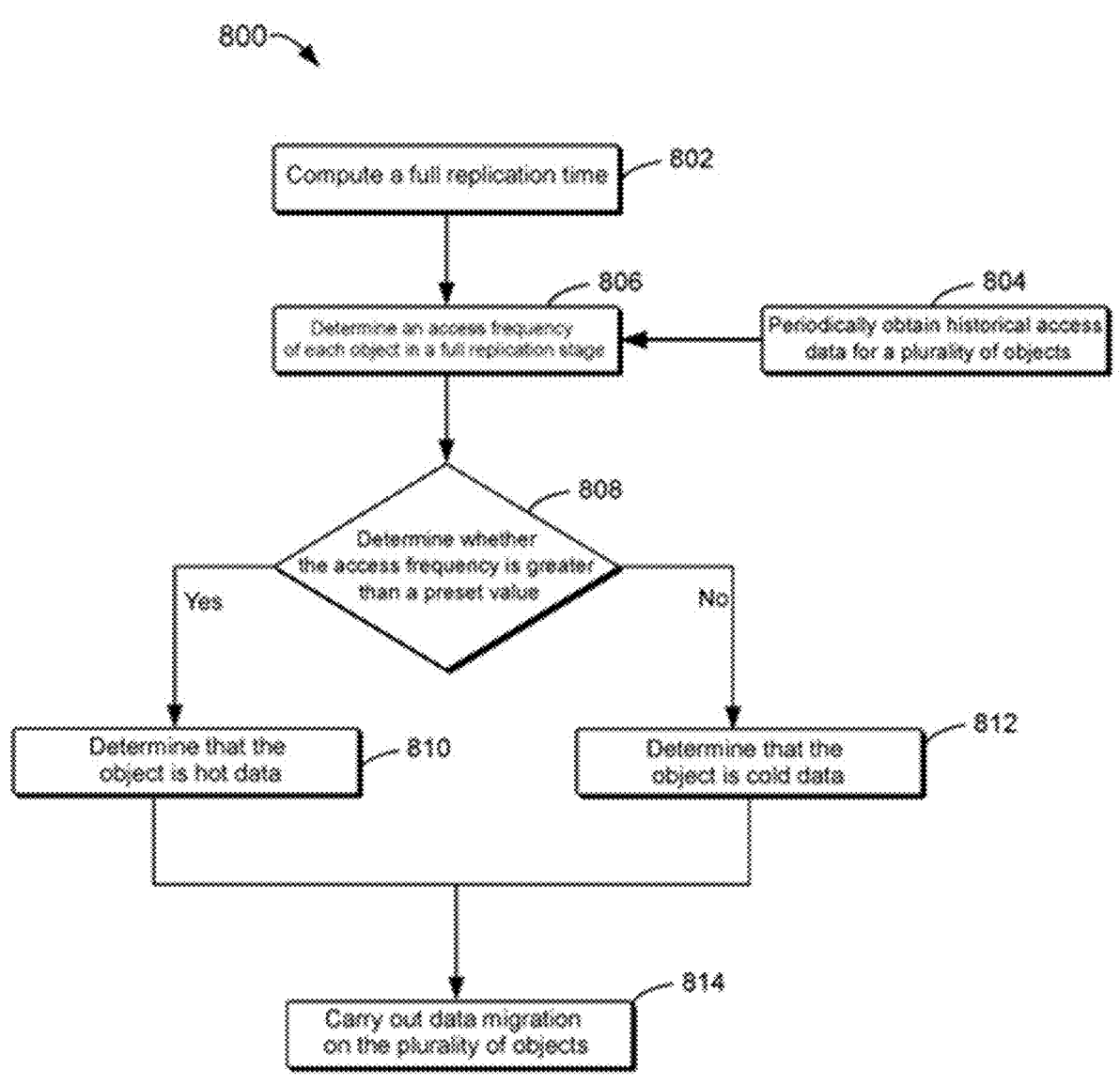
FIG. 8 illustrates a flow chart of a method for data migration based on cold data and hot data according to some embodiments of the present disclosure.

FIG. 8 illustrates a flow chart of a method 800 for data migration based on cold data and hot data according to some embodiments of the present disclosure. At block 802, a full replication time is computed. When the full replication time is determined, factors such as performances of master nodes, network bandwidth, and data volume must be taken into account. In actual operations, these factors can be evaluated based on specific application scenarios and requirements, and the time for full replication can be predicted accordingly.

At block 804, historical access data for a plurality of objects is periodically obtained. The historical access data for the plurality of objects can be periodically obtained when a system is idle, that is, before a data migration begins. Periodically obtaining the historical access data ensures that sufficient data is effectively collected for subsequent analysis without affecting the normal operation of the system. Detection on the historical access data is dynamically updated with time, and this dynamic updating mechanism can well reflect the latest access status of the object and ensure the timeliness and validity of the data.

At block 806, an access frequency for each object in a full replication stage is determined. An access pattern can be determined first based on the historical access data, and then the access frequency for each object in the full replication stage can be determined based on the access pattern. The access pattern may be any of a trend pattern, a cyclical pattern, and an irregular pattern, or other regular patterns and can be specifically defined based on actual needs, which is not restricted here. The access situation of each object in the full replication stage can be accurately predicted by determining the access pattern, thereby providing strong support for the formulation of data migration strategies.

At block 808, whether the access frequency is greater than a preset value is determined. When whether an object is cold or hot data is determined, the access frequency needs to be compared with a preset value to determine whether the access frequency exceeds the preset value. By comparing the access frequency with the preset value, the objects with low access frequencies and the objects with high access frequencies can be identified more accurately, that is, cold and hot data division is performed on the objects. At block 810, when the access frequency is greater than the preset value, it is determined that the object is hot data. At block 812, when the access frequency is less than the preset value, it is determined that the object is cold data.

At block 814, data migration is performed on the plurality of objects. After cold and hot data division is performed on the plurality of objects, a required or requested data migration can be achieved by a method of performing full replication on the cold data first and then performing full replication on the hot data. The objects with higher access frequencies are arranged later for replication, which can ensure that there is more time to capture newly added and modified data for these objects in the full replication stage. Since these objects are likely to be frequently accessed after the migration begins, their newly added and modified data are placed in the full replication stage as much as possible, which can effectively reduce the data synchronization demands for these objects in the incremental replication stage, thereby further improving the migration efficiency.

Figure 9:
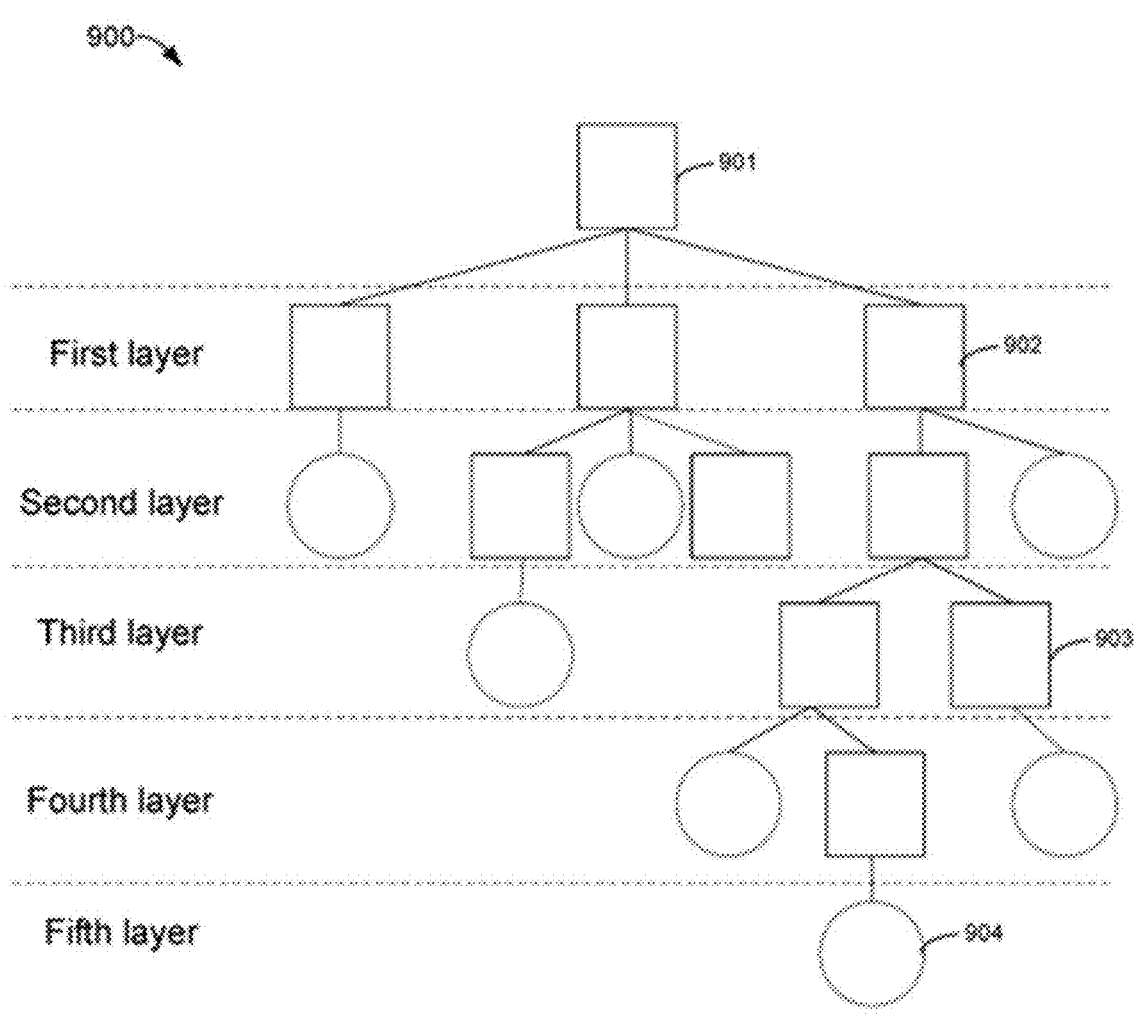
FIG. 9 illustrates a schematic diagram of performing traversal on a folder according to some embodiments of the present disclosure.

FIG. 9 illustrates a schematic diagram of performing traversal 900 on a folder according to some embodiments of the present disclosure. Before the data migration begins, the system asks a user whether to carry out data pre-collection before an actual data migration begins. If the user consents, the collection of historical access data of an object will begin one week or other reasonable time prior to the data migration. When the object is a folder structure, a process of obtaining historical access data includes traversing a folder layer by layer, obtaining historical access data for at least one file in the folder, and in response to a determined access pattern being one of set access patterns or the number of traversed layers reaching a threshold, stopping traversing.

In some embodiments, the folder includes a root directory 901 and five levels in which a first layer includes a user directory 902, a third layer includes a user subdirectory 903, and a fifth layer includes a user file 904. When a set threshold is 5 layers, a system traverses from the first layer to obtain and then analyze historical access data of the first layer, and if it can be determined that the access pattern of the first layer is one of the set access patterns, the system stops traversing; otherwise, the system continues traversing a second layer, and so on, until the fifth layer is traversed. Through layer-by-layer traversal, the system can immediately stop traversing when it finds a layer matching the set access pattern, so that unnecessary deep traversal is avoided, thereby improving the analysis efficiency, saving system resources, optimizing resource allocation, and reducing migration risks.

Figure 10:
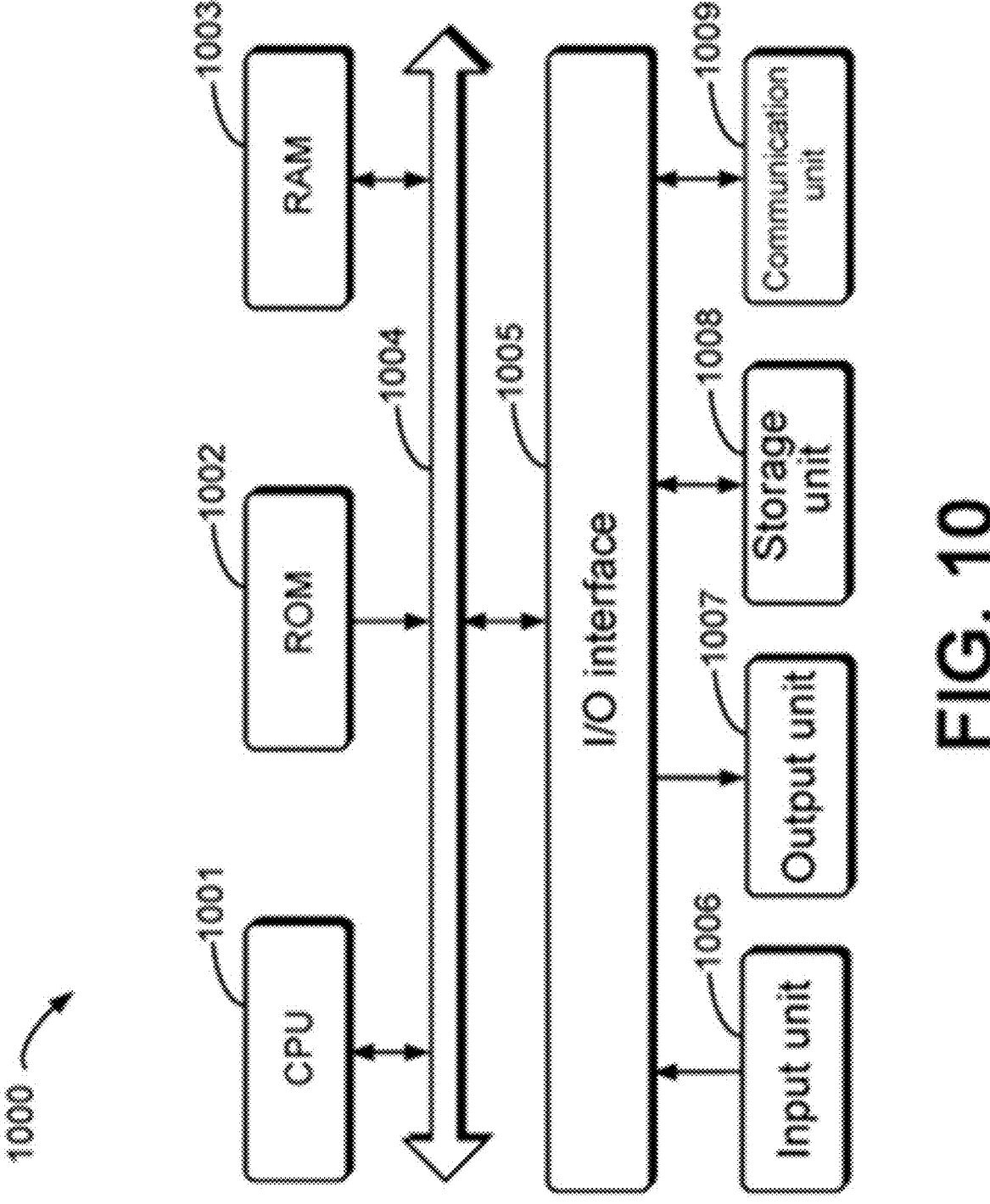
FIG. 10 illustrates a block diagram of a device that can implement a plurality of embodiments of the present disclosure.

FIG. 10 illustrates a schematic block diagram of an example device 1000 that can be used to implement the embodiments of the present disclosure. As illustrated in the figure, the device 1000 includes a computing unit 1001 that can execute various appropriate actions and processing according to computer program instructions stored in a read-only memory (ROM) 1002 or computer program instructions loaded from a storage unit 1008 to a random access memory (RAM) 1003. Various programs and data required for the operation of the device 1000 may also be stored in the RAM 1003. The computing unit 1001, the ROM 1002, and the RAM 1003 are connected to each other through a bus 1004. An input/Output (I/O) interface 1005 is also connected to the bus 1004.

A plurality of components in the device 1000 are connected to the I/O interface 1005, including: an input unit 1006, such as a keyboard and a mouse; an output unit 1007, such as various types of displays and speakers; the storage unit 1008, such as a magnetic disk and an optical disc; and a communication unit 1009, such as a network card, a modem, and a wireless communication transceiver. The communication unit 1009 allows the device 1000 to exchange information/data with other devices via a computer network, such as the Internet, and/or various telecommunication networks.

The computing unit 1001 may be various general-purpose and/or special-purpose processing components with processing and computing capabilities. Some examples of computing units 1001 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc. The computation unit 1001 executes various methods and processes described above, such as the method 200. For example, in some embodiments, the method 200 may be implemented as a computer software program that is tangibly included in a machine-readable medium, such as the storage unit 1008. In some embodiments, part or all of the computer program may be loaded and/or installed onto the device 1000 via the ROM 1002 and/or the communication unit 1009. When the computer program is loaded to the RAM 1003 and executed by the computing unit 1001, one or more steps of the method 200 described above may be performed. Alternatively, in other embodiments, the computing unit 1001 may be configured to implement the method 200 in any other suitable manners (such as by means of firmware).

The functions described hereinabove may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program codes for implementing the method of the present disclosure may be written by using one programming language or any combination of a plurality of programming languages. These program codes may be provided to a processor or controller of a general-purpose computer, a special purpose computer, or another programmable data migration apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method, comprising:
based on historical access data for objects, determining, by a computing system comprising at least one processor, an access pattern for an object of the objects;
based on the access pattern, predicting, by the computing system, an access frequency of the object during a duration of a future replication of the objects, wherein the replication comprises a baseline replication phase and an incremental replication phase performed after the baseline replication phase;
based on the access frequency, determining, by the computing system, a likelihood that the object will be accessed by a client system during the baseline replication phase;
based on the likelihood being determined to be above a likelihood threshold, determining, by the computing system, to replicate the object from source equipment to destination equipment during the incremental replication phase; during the incremental replication phase of the object:

determining, by the computing system, that a stub representative of the object exists at the destination equipment, resulting in a stub determination, wherein the stub was stored at the destination equipment during a previous replication of the object, based on the object not yet having been replicated to the destination equipment, based on the stub determination, replicating, by the computing system, a first part of the object that was not replicated during the baseline replication phase, and replicating, by the computing system, a second part of the object, wherein the second part comprises a changed part of the object that was changed after the first part was determined to be replicated; and determining, by the computing system, which of the baseline replication phase or the incremental replication phase is to be used to migrate the object, comprising:

in response to the access frequency being predicted to be greater than a preset value, determining that the object is hot data to be migrated during the incremental replication phase, or in response to the access frequency being predicted to be less than or equal to the preset value, determining that the object is cold data to be migrated during the baseline replication phase.

2. The method of claim 1, wherein the access pattern comprises at least one of a trend pattern, a cyclical pattern, or an irregular pattern.

3. The method of claim 2, wherein, the predicting of the access frequency comprises:

in response to the access pattern being determined to be the trend pattern, predicting the access frequency based on a trend function.

4. The method of claim 3, wherein the predicting of the access frequency comprises:

based on the trend function and the duration of the future replication of the objects, predicting the access frequency at time points within the duration of the future replication of the objects; and based on the predicting of the access frequency at the time points, predicting an average access frequency for the object for the duration of the future replication of the objects, wherein the likelihood that the object will be accessed during the baseline replication phase is further based on the average access frequency.

5. The method of claim 2, wherein the predicting of the access frequency comprises:

in response to the access pattern being determined to be the cyclical pattern, predicting the access frequency based on a cyclical function.

6. The method of claim 5, wherein the predicting of the access frequency further comprises:

based on the predicting of the access frequency based on the cyclical function, determining a maximum value and a minimum value of access frequencies of the object in the historical access data, wherein the likelihood that the object will be accessed during the baseline replication phase is further based on an average of the maximum value and the minimum value.

7. The method of claim 2, wherein the predicting of the access frequency further comprises:

in response to the access pattern being determined to be the irregular pattern, determining an average of access frequencies of the object in the historical access data, wherein the likelihood that the object will be accessed during the baseline replication phase is further based on the average of the access frequencies.

8. The method of claim 1, wherein, in response to the object being determined to be the cold data, arranging the object to be replicated before a different object determined to be the hot data.

9. The method of claim 1, wherein the object comprises a folder, and wherein the predicting of the access frequency of the object comprises:

traversing the folder layer by layer to obtain folder historical access data for at least one file in the folder;

based on the folder historical access data, determining an access pattern of the file; and in response to at least one of:

the access pattern being determined to be a recognized access pattern, or a number of traversed layers of the folder being determined to have reached a threshold, stopping the traversing.

10. A device, comprising:

at least one processor; and a storage apparatus coupled to the at least one processor and having instructions stored thereon, wherein the instructions, when executed by the at least one processor, cause the device to perform actions comprising:

based on historical access data for objects, determining an access pattern for an object of the objects;

based on the access pattern, predicting an access frequency of the object during a duration of a replication of the objects, wherein the replication comprises a baseline replication phase and an incremental replication phase performed after the baseline replication phase;

based on the access frequency, determining a likelihood that the object will be accessed by a client system during the baseline replication phase;

based on the likelihood being determined to be above a likelihood threshold, determining to replicate the object from source equipment to destination equipment during the incremental replication phase;

during the incremental replication phase of the object:

determining that a stub representative of the object exists at the destination equipment, resulting in a stub determination, wherein the stub was stored at the destination equipment during a previous replication of the object, based on the object not yet having been replicated to the destination equipment, based on the stub determination, replicating a first part of the object that was not replicated during the baseline replication phase, and replicating a second part of the object, wherein the second part comprises a changed part of the object that was changed after the first part was determined to be replicated; and determining whether the baseline replication phase or the incremental replication phase is to be used to migrate the object, comprising:

in response to the access frequency being predicted to be greater than a preset value, determining that the object is hot data to be migrated during the incremental replication phase, or

in response to the access frequency being predicted to be less than or equal to the preset value, determining that the object is cold data to be migrated during the baseline replication phase.

11. The device of claim 10, wherein the respective access patterns comprise at least one of a trend pattern, a cyclical pattern, or an irregular pattern.

12. The device of claim 11, wherein the actions further comprise, in response to an access pattern of the respective access patterns being determined to be the trend pattern, employing a trend function to predict an access frequency based on the access pattern.

13. The device of claim 12, wherein the actions further comprise:

based on the trend function, predicting respective access frequences of the at least two objects at time points within the baseline replication of the at least two objects; and based on the predicting of the respective access frequences at the time points, predicting respective average access frequences of the at least two objects within the baseline replication of the at least two objects.

14. The device of claim 11, wherein the determining of the respective access frequencies comprises:

in response to the access pattern being determined to be the cyclical pattern, predicting the respective access frequencies based on a cyclical function.

15. The device of claim 14, wherein the actions further comprise:

based on the cyclical function, determining respective maximum and respective minimum values of the respective access frequencies in the historical access data; and based on the respective maximum and respective minimum values, determining the respective access frequency.

16. The device of claim 11, wherein the actions further comprise:

in response to the access pattern being determined to be the irregular pattern, determining an average of access frequencies comprised in the access pattern in the historical access data.

17. A non-transitory machine-readable medium comprising executable instructions that, when executed by at least one processor of a computing device, facilitate performance of operations, the operations comprising:

based on historical access data for a group of objects, determining respective access patterns for the group of objects;

based on the respective access patterns, determining respective access frequencies for the group of objects in a full replication stage;

based on the respective access frequencies, performing a full replication on the group of objects from source storage equipment to destination storage equipment; and in response to completion of the full replication of the group of objects, based on a stub object representative of at least one object of the group of objects being stored at the destination storage equipment, performing an incremental replication on the at least one object to complete data migration, wherein the performing of the full replication comprises:

for an object in the group of objects, determining whether an access frequency corresponding to the object is greater than a preset value, in response to the access frequency being determined to be greater than the preset value, determining that the object is hot data, or in response to the access frequency being determined to be less than or equal to the preset value, determining that the object is cold data, and based on the hot data or the cold data, performing the full replication on the group of objects.

18. The non-transitory machine-readable medium of claim 17, wherein, in response to the object being determined to be the cold data, scheduling the object to be replicated before a different object determined to be the hot data.

19. The non-transitory machine-readable medium of claim 17, wherein the respective access patterns comprise at least one of a trend pattern, a cyclical pattern, or an irregular pattern.

20. The non-transitory machine-readable medium of claim 19, wherein, in response to an access pattern of the respective access patterns being determined to be the trend pattern, employing a trend function to predict the access frequency of the object based on the access pattern.

* * * * *